United States Patent [19]

Schultz

[11] Patent Number: 5,063,980
[45] Date of Patent: Nov. 12, 1991

[54] CUTTER HEAD ASSEMBLY

[76] Inventor: David A. Schultz, R.D. 5, Box 59, Valatie, N.Y. 12184

[21] Appl. No.: 423,834

[22] Filed: Oct. 19, 1989

[51] Int. Cl.⁵ .............................................. B27B 33/00
[52] U.S. Cl. .................................. 144/223; 144/218; 144/219; 83/837; 83/838
[58] Field of Search ............... 144/218, 219, 223, 220, 144/231, 235, 236, 39, 41, 37; 83/835, 838, 676, 837

[56] References Cited

U.S. PATENT DOCUMENTS

| | | | |
|---|---|---|---|
| 2,600,280 | 6/1952 | Staples. | |
| 2,635,657 | 4/1953 | Dietrich | 144/223 |
| 3,780,778 | 12/1973 | Chapman | 144/223 |
| 4,614,463 | 9/1986 | Hughes | 144/219 |
| 4,964,448 | 10/1990 | Schultz | 144/218 |

Primary Examiner—W. Donald Bray
Attorney, Agent, or Firm—John P. Halvonik

[57] ABSTRACT

Shims are selectively added to, in one form of the invention, or removed from, in another form of the invention, the space between a cutter body and a circular saw blade in a cutter tool assembly for cutting a round on wood products, to compensate for the change in cutting radius that occurs when the tool is sharpened.

13 Claims, 3 Drawing Sheets

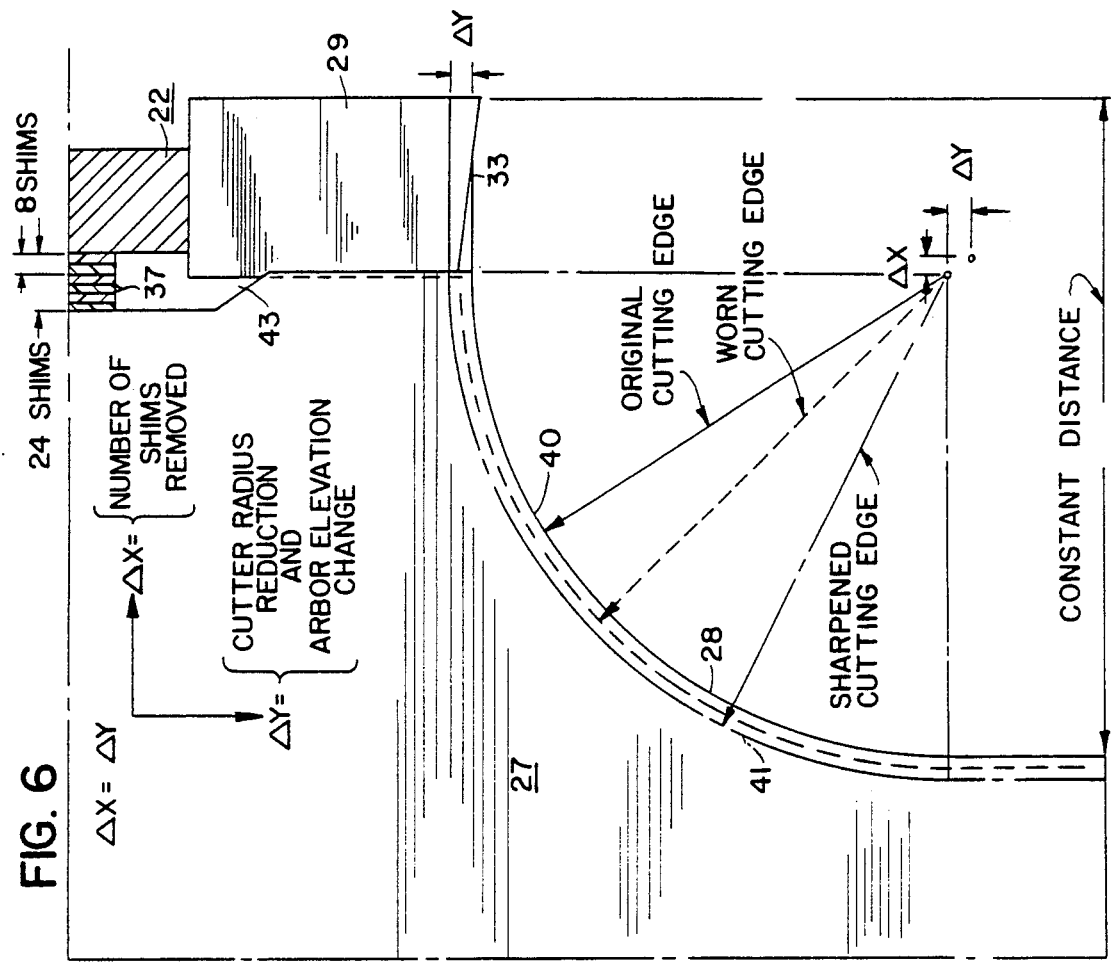
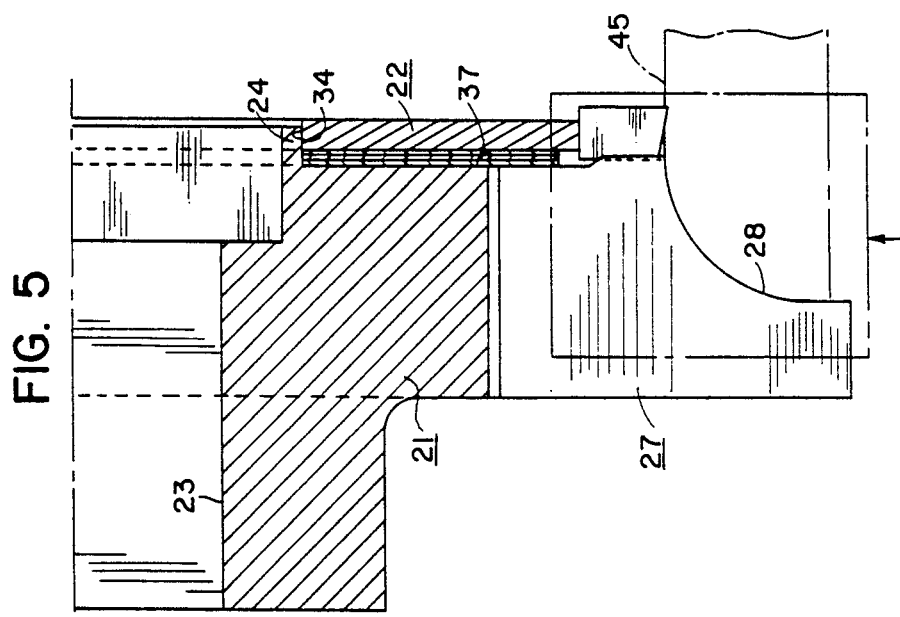

CUTTER HEAD ASSEMBLY

BACKGROUND OF THE INVENTION

Cutter heads for providing a concave or convex round on the edge of a board are well known in the prior art. Such cutter heads essentially have solid carbide or steel cutter elements or wings rigidly fixed, as by brazing, to a base disk. The cutter elements or wings, either concave or convex, were sharpened during the course of use of the cutter head. Such sharpening changed the radius of curvature of the cutting head to either, in the case of the concave cutter head, enlarge the radius or, in the case of a convex cutter head, reduce the radius. Thus, after a number of sharpenings, the cutter head no longer provided a consistent, true dimension of round on the work.

Efforts have been made to provide adjustment features on all cutter heads, such as removable wings which are bolted into position. This has proven to be an expensive and time-consuming procedure and, in general, in practice, not accurate.

SUMMARY OF THE PRESENT INVENTION

This invention pertains to a cutter head assembly for milling a round on the edge or side of a solid wood or wood composition product. Specifically, the invention is directed to an arrangement wherein the cutter head assembly can be suitably sharpened to a different radius of curvature, and then adjusted to compensate for such sharpening, to provide radially a consistent dimension, in a milling procedure.

The present invention is directed to essentially a two-piece cutter head assembly wherein the body or base portion of the head has integral therewith cutter elements or wings as in the prior art, ¼ round in form, either concave or convex, which performs a cutting operation on the wood. The present invention includes, however, a second element in the assembly, in the form essentially of a circular saw blade which is removably secured to the cutter body proper to form a part of the cutting radius. Removable shims are located between the circular saw blade and the cutter head body when the body and blade are first assembled.

As the cutter head wings are sharpened during wear of of the head, shims are selectively removed to continue to provide a true dimension so that a continuing true radius is consistently obtained. The arbor, which supports and drives the cutter assembly, is also adjusted, either by lowering or elevating with respect to the work, to compensate for the sharpening.

By virtue of the present arrangement, a true radius can continuously be obtained on the edge of a wood product, notwithstanding repeated sharpenings of the tool. The invention requires simply selective removal of shims and selective displacement of the cutter arbor to provide such continuing beneficial results.

BRIEF DESCRIPTION OF THE DRAWINGS

FIG. 5 is an enlarged fragmentary sectional view taken on the line 5—5 of FIG. 1.

FIG. 6 is a greatly enlarged fragmentary view of the details enclosed within the box designated "FIG. 6" in FIG. 5. The purpose is to illustrate method of use.

DETAILED DESCRIPTION OF THE INVENTION

Figure 2:
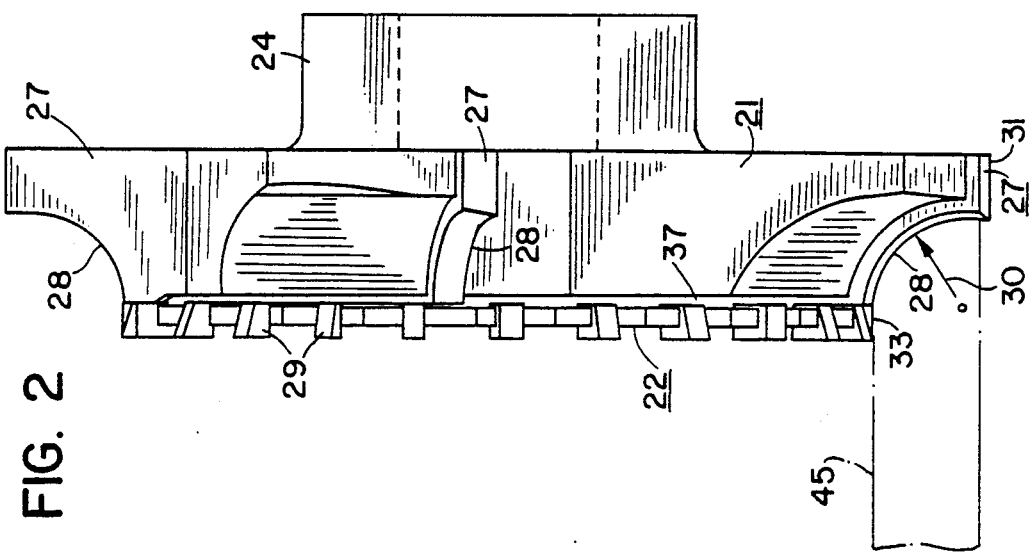
FIG. 2 is a side elevational view of the cutter head assembly, as viewed from the right-hand side of FIG. 1.
Figure 1:
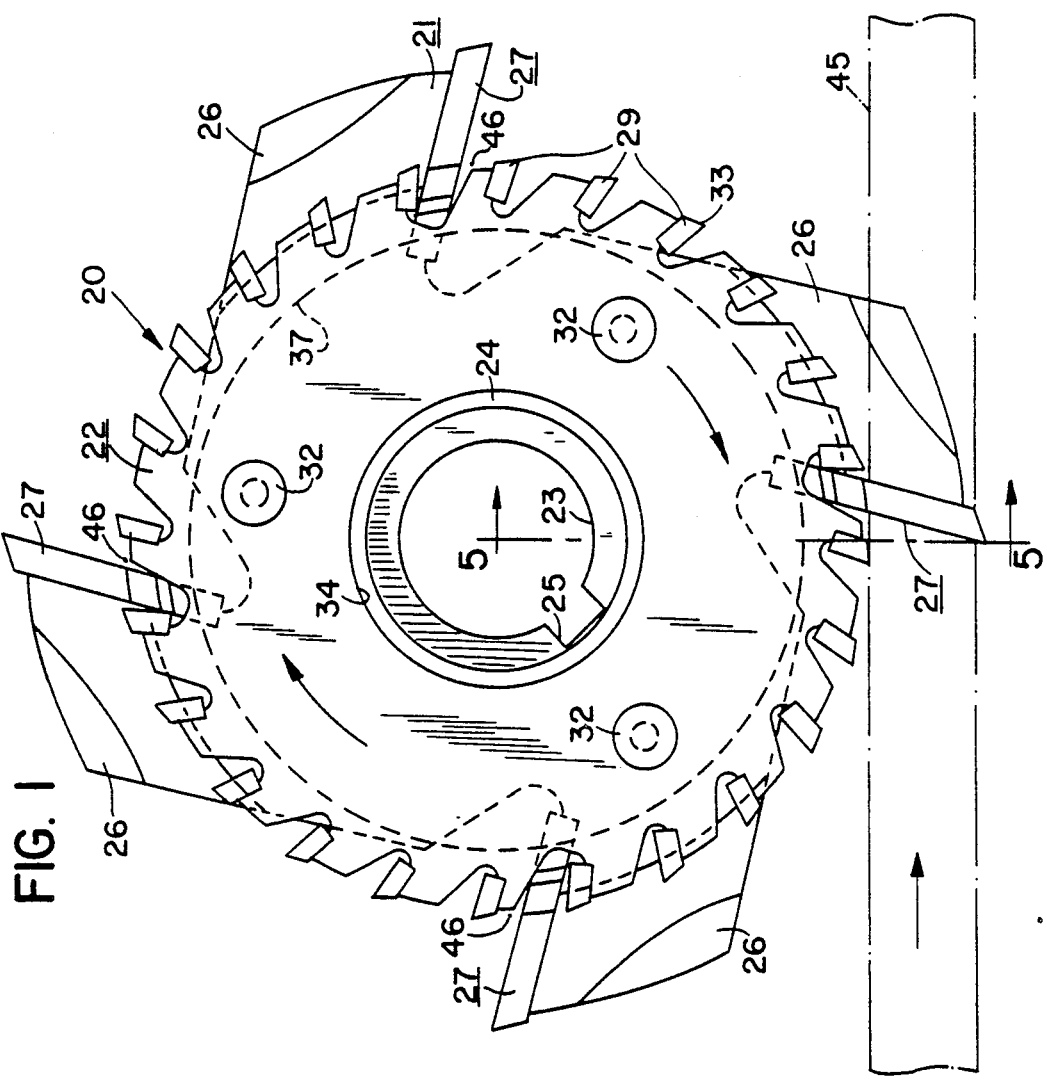
FIG. 1 is a front elevational view of the milled pattern cutter head assembly in accordance with my invention.
Figure 4:
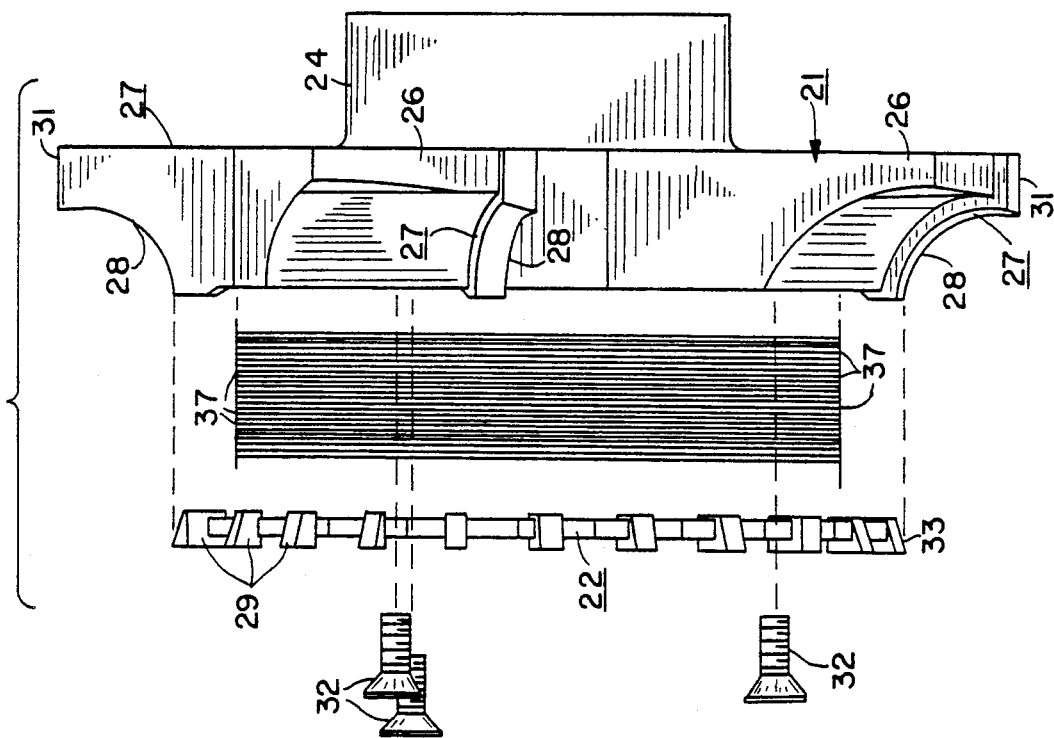
FIG. 4 is an exploded side elevational view of the cutter head assembly shown in FIGS. 1-3, illustrating its principal components.
Figure 3:
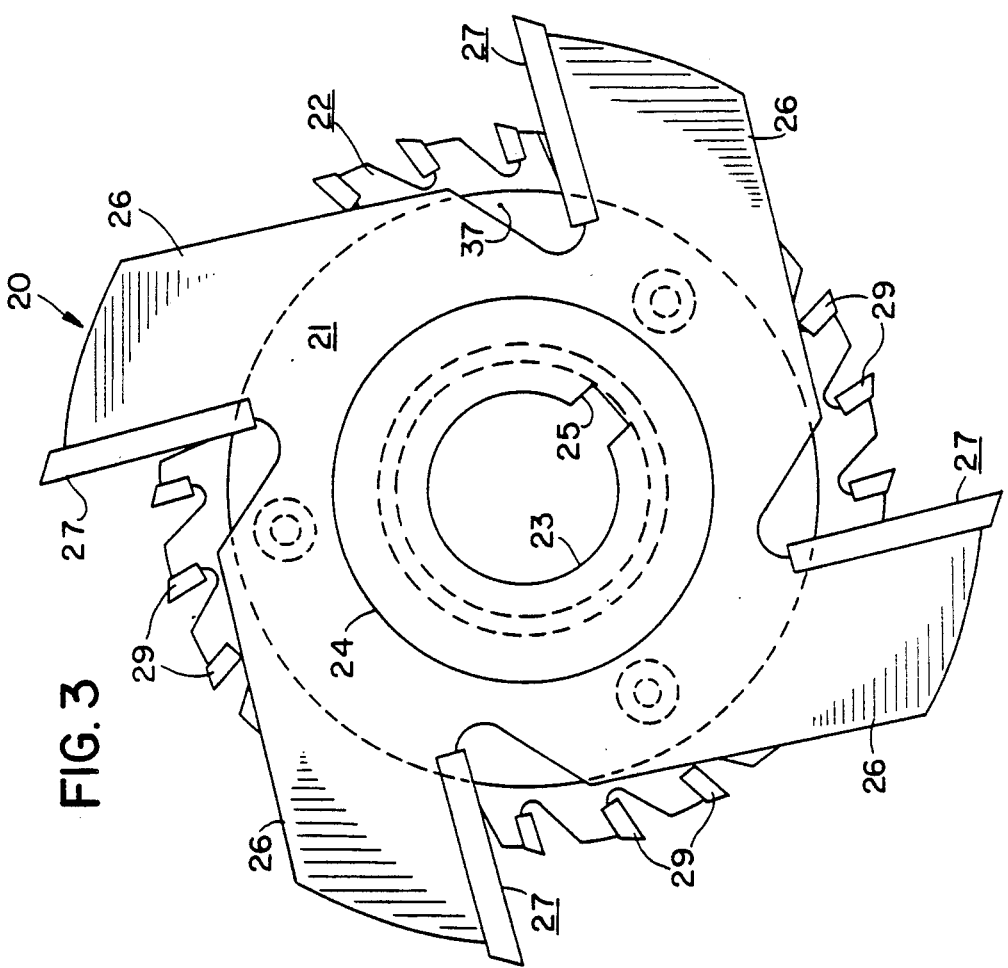
FIG. 3 is a rear elevational view of the cutter head assembly shown in FIG. 1.

Referring to FIGS. 1 and 2, I show a milled-to-pattern head assembly 20 comprising generally a cutter body 21 and a circular saw blade 22. Cutter body 21 has a hub portion 24 integral therewith, having a central bore 23. Bore 23 includes a keyway 25 for securing the cutter body to a keyed arbor shaft in the well known prior art manner. Cutter body 21 has integrated radially extending portions comprising wings 26; in this case, four in number.

The radially extending wings 26 have carbide cutting tips 27 suitably sharpened at their cutting edges 28. Cutting tips 27 are welded or otherwise secured to the wings 26 in the prior art manner. Cutting tips 27 have cutting edges 28 which, as seen for instance in FIG. 2, comprise a radius 30 and edge portion 31. Edge portion 31 forms no part of the invention.

As seen in FIGS. 1 and 2, a circular saw blade 22 is secured to the cutter head 21 by Allen head screws 32. Circular blade 22 is of a diameter wherein the teeth 29 at their outer cutting tip 33 provide a continuation of the radius of the cutting edge 28.

Between cutter body 21 and circular saw blade 22, a series of shims 37 are interposed. These shims 37 can be, for instance, about 3.62" in diameter on a cutter head having, for instance, a minor pattern diameter of 4.75". The radius of curvature of the round to be cut on the board edge could be, for instance, ⅜". The thickness of the circular saw blade width of kerf in such construction would be 3/16".

The shims are suitably of 0.002" thickness and twenty-four in number to provide a total shim thickness between cutter head body and the circular saw of 0.048".

The cutter head in assembled condition is used in the well known manner on, for instance, molders, wherein the cutter is rotated on a horizontally extending shaft. A wooden board 45 extended in a horizontal plane is fed through the cutter head in the well known manner to obtain a suitable round which would be obtained with the illustrated cutter or, where desired, a suitable concave cut in the wood obtained by a cutter having convex wings.

After the cutting head becomes dull, the head assembly 20 is removed from the molder and disassembled. The Allen head screws 32 are removed and the blade 22 and shims 37 separated from the cutter body 21. The carbide cutter tips 27 are sharpened in the well known manner by simply face-grinding. In such face-grinding, a flat portion of the cutter tip 27 is removed to expose a new cutter edge, and hence a new cutter radius. The faces on both the tips 27 and saw teeth referred to later, which intersect to form the cutting edge, are at a consistent angle, so that the new cutting edge continues to be a true portion of a circle. The new cutter radius will be of course of greater radius than the previous cutter radius before sharpening.

There is shown in FIG. 6, diagrammatically, the concept involved in the invention. The edge 40 with the original radius is used until the tool becomes dull. The face of the cutter tip 27 is sharpened, resulting in an edge 41 with a sharpened cutter radius. The original, worn, and sharpened cutting edges, as well as the corresponding radii are shown in FIG. 6. Such change in radius is projected, in FIG. 6, onto an XY axis wherein X represents the horizontal when the cutter head is mounted in the molding tool referred to above, and Y represents the vertical direction in the mounting of such device on the machine. Hence, it will be seen that if the tool were used as in the prior art with such radius change, the round produced on the work product after sharpening would be different from the round produced before sharpening.

The invention compensates for such change to restore the original cutting effect by two means. To compensate for the enlargement in the X direction, as seen in FIG. 6, a sufficient number of shims 37 are removed before the tool is reassembled. Normally one shim 37 would be removed for each sharpening but, in the event it is sharpened to a greater degree, a sufficient additional number of shims 37 are removed.

When the elements are reassembled, the enlarged radius in the X direction is now compensated for, so that the sharpened cutting edge 41 has been moved in the X, or horizontal, direction to the original cutting edge 40 location, at distance $\Delta X$.

With respect to a compensation in the Y, or vertical, direction, the arbor shaft referred to above is lowered or moved closer to the work, to a distance which is equivalent to the change created by the sharpening effect in the Y.

The enlarged radius in the Y, or vertical, direction is now compensated for, so that the sharpened cutting edge 41 has been moved in the Y or vertical direction, to the original cutting edge 40 position, a distance $\Delta X$.

Sharpened cutting edge 41 has now been essentially relocated to the original cutting edge 40 position.

Saw blade outer cutting tip 33 is also sharpened to reduce the diameter of the saw blade 22 a distance $\Delta X$ to coincide with the enlarged radius from edge 40 to edge 41. Such sharpening should be done on the circular saw blade preferably before assembling.

It should be understood that the cutting profile of the saw teeth 29 at outer cutting tip 33 should be such as to provide a continuous smooth, round effect on the wood board 45 being cut. That is, the effect from the combination of teeth 29, whether beveled or not, should work to provide such smooth effect.

The circular saw blade teeth 29 are preferably faceground, which provides the same effect achieved in face-grinding the cutter tips 27.

Although it will be seen that the choice of shim numbers is somewhat arbitrary, it has been found that a practical limit on the number of shims 37 would be such as to provide an initial spacing between the cutter body 21 and the circular saw blade 22 of 0.048". It is generally unnecessary to provide a greater number since it has been found that the saw blade 22 can only be face-sharpened to an extent wherein such number of shims 37 are necessary to compensate. By the time such number of shims 37 are used up, both the saw blade 22 and the cutter tips 27 have been effectively ground away.

An overlap of the body 21 and saw cutting tip 33 is provided by an undercutting or trepanning 43 so that no uncut portion remains in board 45 even when there are a maximum number of shims 37 inserted. Of course the cutter body 21 and circular saw blade 22 must be so registered angularly as seen in FIG. 1 so that there is no interference between the body cutter tips 27 and the respective teeth 29 as seen with the clearances at 46 in FIG. 1. In other words, there must be a staggered pitch in the meeting of the cutter body 21 and the circular saw blade 22.

The circular saw blade 22 is further accurately located in the combination by providing an interior hub 24 on the cutter body 21 which is precision-formed to be located within a preformed opening 34 in the circular saw blade 22 itself. Such precision mounting of opening 34 and hub 24 permits the saw blade 22 to be accurately located on the cutter body 21 from a concentricity stand-point.

The screws 32 retain the blade on the body axially to support this relationship.

By placing the Allen head set screws 32 at other than a symmetrical disposition, that is at intervals other than 120°, means are provided to register the circular saw blade to the cutter body in the same relative angular position so that the pitch stagger is reliably obtained. In other words, the saw blade 22 can go onto the body 21 in only one position.

It should be understood that any suitable combination of numbers of wings 26 and numbers of saw teeth 29 can be used, providing the essential features of the invention are preserved as described above.

The example shown herein is directed to a concave cutter arrangement which provides a convex round on the wood products. It should be understood that the invention also includes a cutter head having a convex cutter tip, wherein a concave round is formed on the wood product. When this embodiment of the invention is practiced, no shims are present when the body 21 and saw blade 22 are assembled. As the wings 26 and teeth 29 are sharpened, the radius is reduced so that shims are selectively added to maintain the true, original radius.

A plurality of the device described above can be used in various combinations to achieve various results on a wood product, on both vertical and horizontal arbored machines. Where a vertically arbored machine is used, the reference above to the X and Y axis would of course be rotated.

I claim:

1. A cutter head assembly for cutting a round on a wood product comprising:
   A. a cutter body having:
      1) a base portion,
      2) at least a wing on the base portion with a cutter tip having an original cutting edge in an arcuate form having a first radius of curvature,
   B. a circular saw blade removably secured to said body, having cutting teeth having an outer cutting edge, said outer cutting edge forming a continuous, uninterrupted cutting edge with said body cutting edge, and
   C. a plurality of shims that can be positioned between said cutter body and said saw blade;
   wherein said shims are selectively added or removed from between said body and saw blade to compensate for any change in the first radius of curvature when the cutter body wing cutting edge is sharpened to a second radius of curvature.

2. The apparatus of claim 1 wherein said original cutting edge is concave.

3. The assembly of claim 1 wherein said original cutting edge is convex.

4. The assembly of claim 2 wherein said original cutting edge is about ¼ round in form.

5. The assembly of claim 3 wherein said original cutting edge is about ¼ round in form.

6. The assembly of claim 4 having an arbor in connection with said assembly, said arbor capable of supporting and driving said assembly, said arbor capable of compensating for the sharpening of said original cutting edge by lowering or raising with respect to said wood product.

7. The assembly of claim 5 having an arbor in connection with said assembly, said arbor capable of supporting and driving said assembly, said arbor capable of compensating for the sharpening of said original cutting edge by lowering or raising with respect to said wood product.

8. The assembly of claim 6 wherein said circular saw blade has a width of kerf of about 3/16" and said first radius of curvature is about ⅜".

9. The assembly of claim 7 wherein said circular saw blade has a width of kerf of about 3/16" and said first radius of curvature is about ⅜".

10. The assembly of claim 8 wherein said shims are about 0.002" in thickness and number about 24.

11. The assembly of claim 9 wherein said shims are about 0.002" in thickness and number about 24.

12. The assembly of claim 10 wherein said cutter tip is made of carbide.

13. The assembly of claim 11 wherein said cutter tip is made of carbide.

* * * * *